United States Patent [19]

Dawson

[11] Patent Number: 4,644,680
[45] Date of Patent: Feb. 24, 1987

[54] TRANSMITTER ROD

[75] Inventor: James W. Dawson, Tulsa, Okla.

[73] Assignee: Brunswick Corporation, Skokie, Ill.

[21] Appl. No.: 838,140

[22] Filed: Mar. 10, 1986

[51] Int. Cl.4 ............................................. A01K 87/00
[52] U.S. Cl. ........................................... 43/18.1; 43/23
[58] Field of Search ..................... 43/18.1, 22, 23, 18.5

[56] References Cited

U.S. PATENT DOCUMENTS

| 2,252,054 | 8/1941 | Welch | 43/23 |
|---|---|---|---|
| 2,597,738 | 5/1952 | Koos | 43/23 |
| 2,667,713 | 2/1954 | Stephens | 43/22 |
| 2,711,047 | 6/1955 | Shepherd | 43/23 |
| 4,398,369 | 8/1983 | Wiebe | 43/18.1 |
| 4,463,512 | 8/1984 | McCreery | 43/22 |
| 4,516,351 | 5/1985 | Highby | 43/23 |

Primary Examiner—Gene P. Crosby
Attorney, Agent, or Firm—Wood, Dalton, Phillips, Mason & Rowe

[57] ABSTRACT

According to the disclosure a transmitter assembly is provided having a transmitter member, which is preferably separate from and cooperates with both a rod blank and a rod handle. In a preferred form the transmitter member extends within a hollow portion of the rod blank. A transmitter element is interposed between an inside surface bounding the hollow portion of the rod blank and the transmitter member to effectively conduct vibrations imparted through the rod blank to the transmitter member. The transmitter member is associated with the rod handle so that a user can effectively sense vibration of the transmitter member.

13 Claims, 9 Drawing Figures

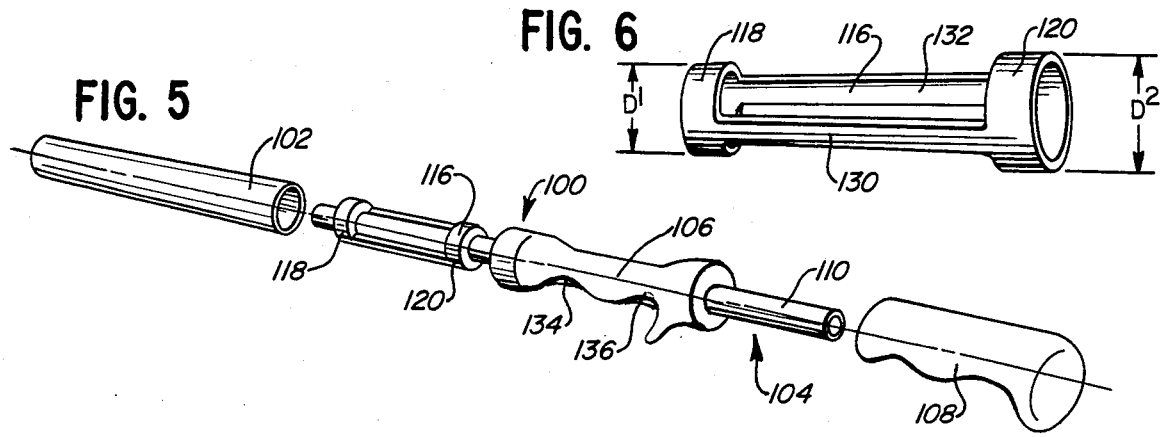
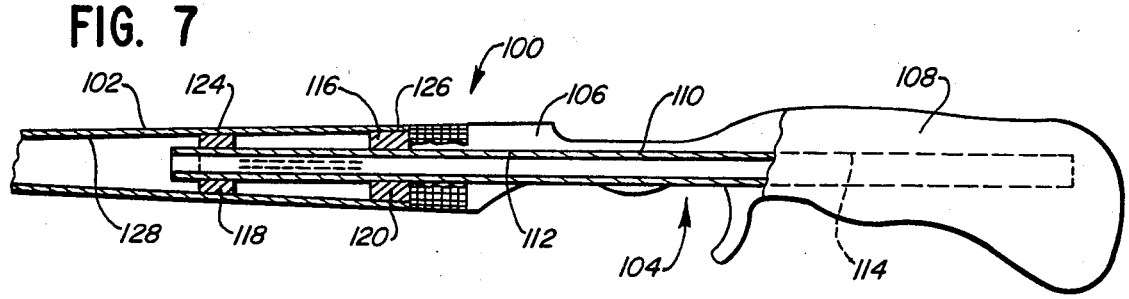
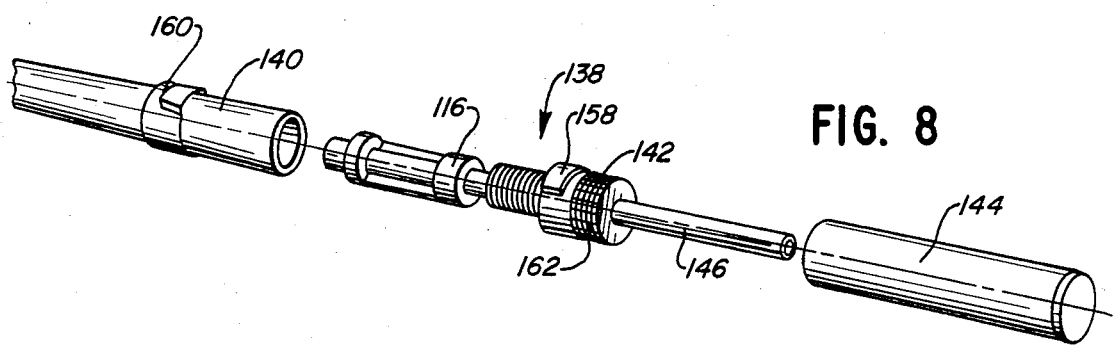
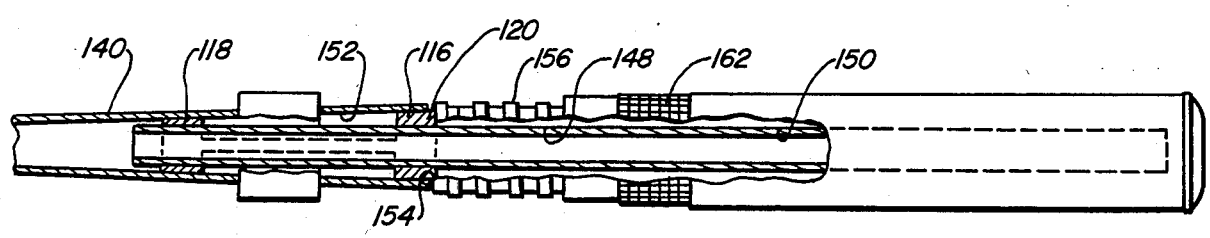

TRANSMITTER ROD

BACKGROUND OF THE INVENTION

1. Field of the Invention

This invention relates to fishing rods and, more particularly, to structure associated with the rod to enhance user sensitivity to vibration thereof.

2. Background Art

Designers of fishing rods strive to optimize the sensitivity of the rod to vibrations imparted through an associated fishing line. It is desirable to sense even very slight nibbling by fish on a bait so that the fisherman can react timely and appropriately.

One attempt to enhance the sensitivity of a rod is demonstrated in U.S. Pat. No. 4,463,512, to McCreery. In McCreery, an elongate notch is provided in the rod handle and seats the rod blank in operative position. The rod blank is captured in the notch between a mounting foot on the reel and the rod handle. One drawback with the McCreery structure is that the rod blank is firmly held against the handle along a substantial length thereof so that vibrations imparted to the rod are substantially damped.

Other variations of structure using the principal in McCreery are shown in U.S. Pat. No. 4,398,369, to Wiebe, and U.S. Pat. No. 4,516,351, to Highby. In each of the structures in the latter two patents, the same problem with vibration damping is contended with. The end result is that the sensitivity to the rod flexing and vibration is not appreciably improved over rods wherein the rod blank does not extend into the handle.

SUMMARY OF THE INVENTION

The present invention overcomes the problem identified above in a novel and simple manner. According to the invention a transmitter assembly is provided comprising a transmitter member, which is preferably separate from and cooperates with both a rod blank and a rod handle. In a preferred form the transmitter member extends within a hollow portion of the rod blank. A transmitter element is interposed between an inside surface bounding the hollow portion of the rod blank and the transmitter member to effectively conduct vibrations imparted through the rod blank to the transmitter member. The transmitter member is associated with the rod handle so that a user can effectively sense vibration of the transmitter member.

In a preferred form the transmitter member takes an elongate shape and has a portion of its length unsupported between its ends so that damping of vibration is minimized. The transmitting element interposed between the inside surface of the rod blank and the transmitter member preferably comprises quartz or other material with good vibration transmitting capabilities.

BRIEF DESCRIPTION OF THE DRAWINGS

FIG. 5 is an exploded perspective view of a section of a fishing rod with a transmitter sleeve incorporated in a modified form of the invention;

FIG. 6 is an enlarged perspective view of the transmitter sleeve in FIG. 5;

FIG. 7 is a sectional view of the rod handle in FIG. 5 in assembled state;

FIG. 8 is an exploded perspective view of the transmitter assembly with a transmitter sleeve incorporated into a spinning style fishing rod; and FIG. 9 is a sectional view of the rod in FIG. 8 in assembled state.

DETAILED DESCRIPTION OF THE DRAWINGS

Figure 1:
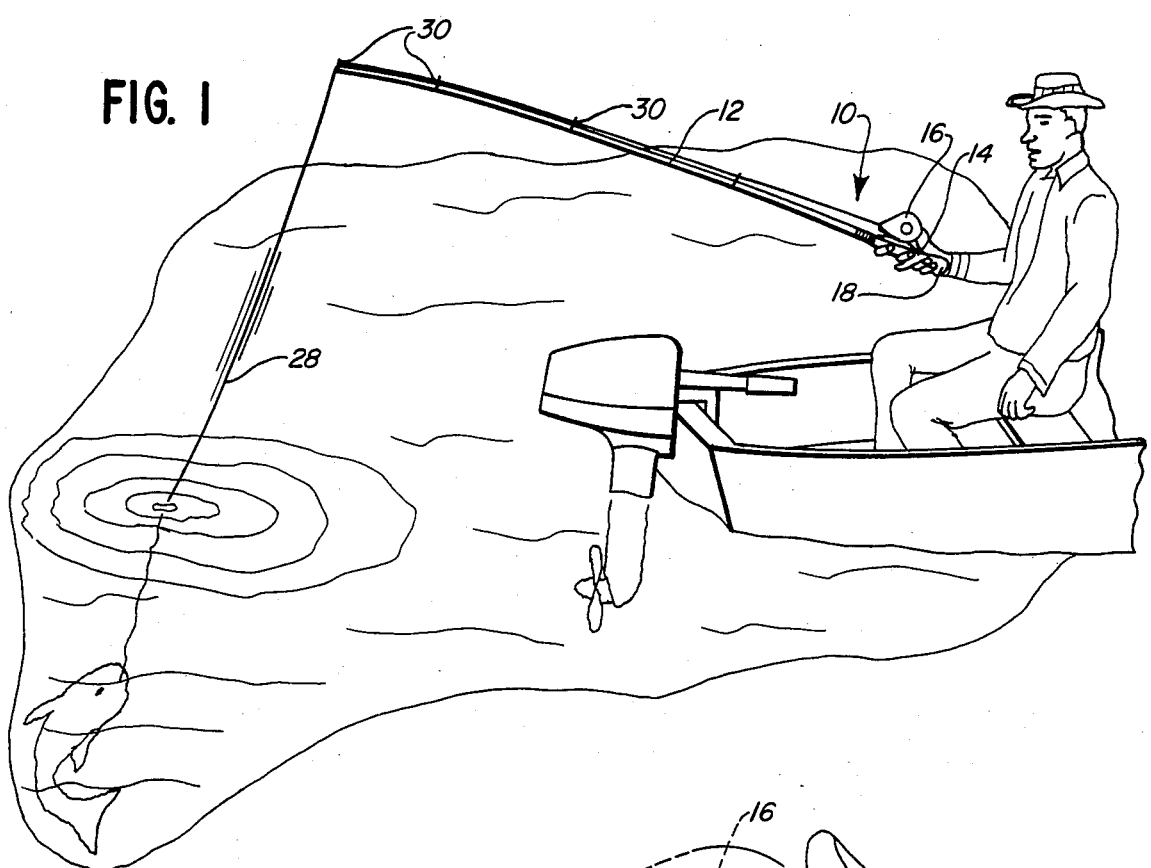
FIG. 1 is a perspective view of a fisherman gripping a casting rod in conventional manner.
Figure 2:
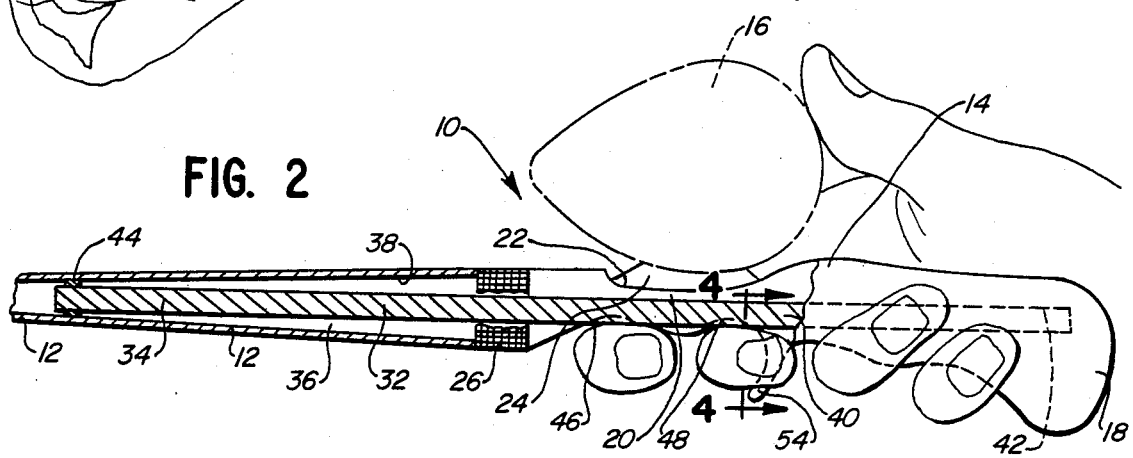
FIG. 2 is a fragmentary, sectional view of a rod blank and rod handle incorporating the transmitter assembly according to the present invention with a user's hand shown gripping the rod handle in conventional manner.

FIGS. 1 and 2 illustrate a grip normally used by fisherman holding a casting rod and reel outfit at 10 for either still fishing or trolling both of which types of fishing demand substantial sensitivity to rod flexing and vibration. The outfit 10 comprises a rod blank 12, rod handle 14 and reel 16 mounted on the rod handle. The rod handle has a gripping portion 18 and a reel mounting portion 20 with a recess 22 for accommodating a mounting foot 24 associated with the reel. The mounting foot 24 is selectively locked in and released from the recess using conventional type structure through the adjustment of a rotatable ring 26 having a knurled outer surface to facilitate gripping for rotation thereof.

It should be understood that while the invention is described in FIGS. 1-7 with respect to a casting rod and reel outfit that the invention contemplates incorporation into any type fishing outfit, i.e. spinning, spin casting and casting. The inventive structure operates the same in each.

Figure 3:
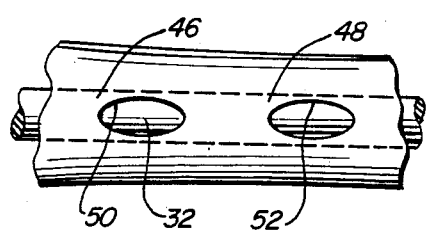
FIG. 3 is a fragmentary underside view of the handle in FIG. 2 showing openings in the rod handle for exposing the transmitter assembly for engagement by the hand of the user.
Figure 4:
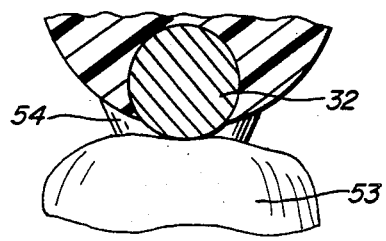
FIG. 4 is an enlarged, fragmentary, sectional view of the user's finger on the transmitter assembly along line 4—4 of FIG. 2.

The objective of the invention is to positively transmit vibrations of the rod so that the vibrations can be sensed by the fisherman. With a fish nibbling on a bait attached to the line 28, the line exerts force on the eyelets 30 through which the line extends on the rod blank 12, thereby tending to flex the rod blank. FIGS. 2–4 clearly illustrate the inventive structure through which these vibrations are transmitted to the user's hand.

According to the invention, a transmitter assembly for conducting vibrations from the rod blank to the rod handle is provided and comprises an elongate, rod-like transmitter member 32, made from hard plastic or other material suitable for vibration transmission. The transmitter member has a forward portion 34 that extends into a hollow portion 36 of the rod blank 12 that is bounded by an inside annular surface 38. The rear portion 40 of the transmitter member 32 seats in a closely mating bore 42 extending lengthwise of the handle through the reel mounting portion 20 and the gripping portion 18.

To conduct vibrations from the rod blank 12 to the transmitter member 32, an annular transmitter ring 44 surrounds the forward portion 34 of the transmitter member 32 and is interposed intimately between the rod blank 12 and transmitter member 32. Preferably the transmitter ring comprises a quartz material or other material suitable for vibration transmission. The transmitter member 32 is principally supported by the ring 44 and handle 14 and is substantially unsupported therebetween in the hollow portion 36 of the rod blank. Accordingly, the unsupported portion of the transmitter member acts as a sounding board or tuning fork in positively conducting vibrations imparted from the rod blank to the hand-held portion of the handle, the idea being to provide as long a free transmitting portion of the transmitter member 32 as possible while minimizing the supported portion in the handle, thereby minimizing damping of the vibrations forward of the users grip that senses the vibrations.

To allow the user to sense the vibration of the transmitter member 32, the gripping portion 18 of the rod handle is contoured on its underside to define one or more curved seats 46, 48, for reception of the user's fingers. The seats are of sufficient radial extent with respect to the transmitter member 32 that they intersect the bore 42, thereby forming openings 50, 52 through which the transmitter rod is exposed for direct contact by the user's fingers as shown in FIGS. 2–4.

With the rod handle in FIG. 2, the user has the option of having either one or two fingers contact the transmitter member. With the grip in FIG. 2, the user places the gripping portion of the rod handle in the palm of the hand and surrounds the gripping portion with the little and ring fingers. The index finger can be placed in the forward seat 46 and the middle finger in the seat 48 and against a finger grip 54, integrally formed with the rod handle. The user's thumb can be used to steady the reel, to actuate operating members on the reel (i.e. the clutch) and to sense vibrations transmitted by the transmitter ring 44 to the transmitter member 32 and to the reel either directly or indirectly. That is, some handles provide for mounting the reel foot directly onto an exposed portion of the transmitter member and receive direct vibrations from the transmitter member while other rod handles mount the reel on the reel mounting portion of the handle out of direct contact with the transmitter member but receive vibrations through the mounting portion due to the greater vibrations transmitted to the mounting portion by the improved transmitter ring and transmitter member structure. Alternatively, the index finger can be placed against the finger grip 54 and against seat 48. With either grip, the user's finger will rest against the underside 56 of the transmitter member 32. With the inventive structure, vibration of the rod is positively transmitted through the transmitter member, which can be directly sensed by the user.

A further embodiment of the invention is depicted in FIGS. 5–7. The fishing rod at 100 comprises a rod blank 102 and a rod handle at 104 consisting of a reel mounting portion 106 and a gripping portion 108. The transmitter rod 110 extends lengthwise of the reel through a throughbore 112 in the reel mounting portion and into a blind bore 114 in the gripping portion 108. A portion of the transmitter rod extends forwardly of the reel mounting portion 106. To this portion, a transmitter sleeve 116 is attached.

The sleeve 116 comprises first and second spaced, annular portions 118, 120, which intimately surround the transmitter rod. With the rod blank assembled on the handle, the outer peripheral surfaces 124, 126 of the sleeve portions 118, 120 seat flushly against the inside rod blank surface 128. The surfaces 124, 126 are tapered to match the tapered inside surface 128 of the rod blank. Radially opposite, elongate ribs 130, 132 interconnect the annular portions 118, 120, to define a unitary sleeve assembly. The ribs 130, 132 are sufficiently narrow that they do not appreciably damp vibrations from the rod. The transmitter rod is exposed between the annular portions 118, 120 and the ribs 130, 132. Openings 134, 136 provided in the reel mounting portion 106 of the handle to permit access to the transmitter rod so that the user can sense vibration thereof.

In FIGS. 8 and 9, the transmitter sleeve 116 is shown incorporated into a spinning rod 138 consisting of a rod blank 140, reel mounting structure 142 and a gripping portion 144. A transmitter rod 146 extends through a throughbore 148 in the reel mounting structure 142 and extends into a blind bore 150 in the gripping portion in a similar fashion as with the casting rod.

With the spinning rod assembled, the spaced annular portions 118, 120 of the sleeve 116 reside closely against the inside surface 152 of the rod blank 140. The annular portion 120 seats in an undercut 154 in the reel mounting structure 142.

The reel mounting foot (not shown) seats closely against a cylindrical, ribbed body 156 of the reel mounting structure 142 and is captured between a clamp 158 on the reel mounting structure 142 and a complementary clamp 160 on the rod blank 140. Rotation of a knurled ring 162 on the reel mounting structure advances the clamp 158 selectively in a lengthwise direction to positively anchor the reel.

The user senses the vibration of the rod blank imparted to the transmitter rod principally through the reel mounting structure 142 and the gripping portion 144 of the spinning rod 138.

It should be understood that the foregoing detailed description was made for purposes of demonstrating the structure and operation of the invention, with no unnecessary limitations to be understood therefrom.

I claim:

1. An improved fishing rod having a rod handle for connection to a rod blank that has a hollow portion with an inside surface, the improvement comprising:
   a transmitter assembly;
   means for interconnecting the rod handle, rod blank and transmitter assembly, said means having a portion of the transmitter assembly lying inside of and in operative contact with the inside surface of the rod blank for conducting vibrations imparted to the rod blank to the transmitter assembly and said means having another portion of the transmitter assembly extending into the rod handle; and
   means on the rod handle for allowing a user of the rod handle to sense the vibrations conducted through the portion of the transmitter assembly extended into the rod handle.

2. The improved fishing rod according to claim 1 wherein the transmitter assembly comprises an elongate transmitter rod and an annular transmitter ring closely surrounding the elongate transmitter rod and in contact with the inside surface of the rod blank.

3. The improved fishing rod according to claim 1 wherein the transmitter assembly comprises an elongate transmitter rod, the rod handle has a bore for accepting a portion of the elongate transmitter rod and an opening is provided in the rod handle in communication with the bore, said opening exposing a portion of the elongate rod so that the user of the rod handle can directly contact the exposed portion of the elongate rod.

4. The improved fishing rod according to claim 1 wherein the transmitter assembly comprises an elongate rod for extension into the hollow portion of the rod blank and a vibration transmitting element interposed between the inside surface of the rod blank and the elongate rod.

5. The improved fishing rod according to claim 3 wherein the rod handle has a gripping portion and a reel mounting portion, the bore extends into the gripping portion of the rod handle and the opening is provided in the reel mounting portion of the rod handle.

6. The improved fishing rod according to claim 4 wherein said vibration transmitting element comprises quartz.

7. An improved fishing rod having an elongate rod handle for connection to a rod blank that has a hollow portion with an inside surface, the improvement comprising:
  said rod handle having a bore extending generally lengthwise thereof;
  a transmitter assembly for extension into the rod handle bore;
  means interconnecting the rod blank, rod handle and transmitter assembly so that a portion of the transmitter assembly lies inside of and is brought into operative contact with the rod blank so that vibrations imparted to the rod blank are conducted through the transmitter assembly; and
  means on the rod handle for allowing a user of the rod handle to sense the vibrations conducted through the transmitter assembly.

8. The improved fishing rod handle according to claim 7 wherein the transmitter assembly has an elongate member and a portion of the elongate member extends into the hollow portion of the rod blank.

9. The improved fishing rod handle according to claim 8 wherein a vibration transmitting element is interposed between the elongate member and the inside surface of the rod blank so that vibrations imparted to the rod blank are conducted through the transmitting element and elongate member.

10. An improved fishing rod having a handle connected to a rod blank that has a hollow portion with an inside surface, the improvement comprising:
  a transmitter member having a length and extension parallel to the rod length;
  means mounting the transmitter member to the fishing rod so that a portion of the transmitter member resides in the hollow portion and another portion of the transmitter member extends into the rod handle,
  said transmitter member being unsupported at least partially along its length to provide effective vibration transmission;
  means for conducting vibrations imparted to the rod blank through the transmitter member; and
  means on the rod handle for allowing a user of the rod handle to sense the vibrations imparted to the transmitter member.

11. An improved fishing rod having a rod handle for connection to a rod blank that has a hollow portion with an inside surface, the improvement comprising:
  an elongate transmitter rod;
  a transmitter sleeve having first and second spaced annular portions;
  means mounting the sleeve to the transmitter rod so that vibrations imparted to the rod blank are conducted through both the first and second annular portions to the transmitter rod; and
  means associated with at least one of the rod blank and rod handle to allow a user of the fishing rod to sense vibration of the transmitter rod.

12. The improved fishing rod according to claim 11 wherein at least one rib interconnects the first and second annular portions so that a portion of the transmitter rod is exposed through the transmitter sleeve between the first and second annular portions.

13. The improved fishing rod according to claim 11 wherein both the first and second annular portions of the sleeve are in contact with the inside surface of the rod blank with the transmitter rod, transmitter sleeve and rod blank in operative relationship with each other.

* * * * *